United States Patent [19]
Nakajima et al.

[11] Patent Number: 5,172,551
[45] Date of Patent: Dec. 22, 1992

[54] ACTUATOR

[75] Inventors: Naomasa Nakajima, Chofu; Mitsuhiro Ando, Tokyo; Yoshihiro Naruse, Ichikawa; Sadao Mikami, Toride; Katsuhiro Sano, Toyota, all of Japan

[73] Assignee: Aisin Seiki Kabushiki Kaisha, Kariya, Japan

[21] Appl. No.: 765,287

[22] Filed: Sep. 25, 1991

[30] Foreign Application Priority Data

Sep. 26, 1990 [JP] Japan .................................. 2-256399

[51] Int. Cl.$^5$ .................................................. F03G 7/00
[52] U.S. Cl. .................................... 60/527; 60/529; 901/15; 901/19
[58] Field of Search ........................ 60/527–531; 901/2, 14–17, 19, 22

[56] References Cited

U.S. PATENT DOCUMENTS 4,716,731 1/1988 Sakai et al. .......................... 60/528
4,751,821 6/1988 Birchard ........................... 60/527 X

OTHER PUBLICATIONS

A resume announcing a conference of the Japan Society of Robot, held Sep. 20–22, 1988, pp. 275–276.
Journal of Japan Society of Robot, vol. 5, No. 2, pp. 3–17, published Apr., 1987 (the last page being and English abstract).

Primary Examiner—Allen M. Ostrager
Attorney, Agent, or Firm—Finnegan, Henderson, Farabow, Garrett & Dunner

[57] ABSTRACT

An actuator is comprised of a plurality of three-dimensionally arranged containers each of which is constructed into deformable configuration and each of which is set to accommodate therein an amount of expandable fluid in response to the increase of the temperature, a heat supply device for supplying the heat to the fluid in each of the containers, a cooling device for cooling the fluid in each of the containers and a control device for controlling the heat supply device and the cooling device.

21 Claims, 11 Drawing Sheets

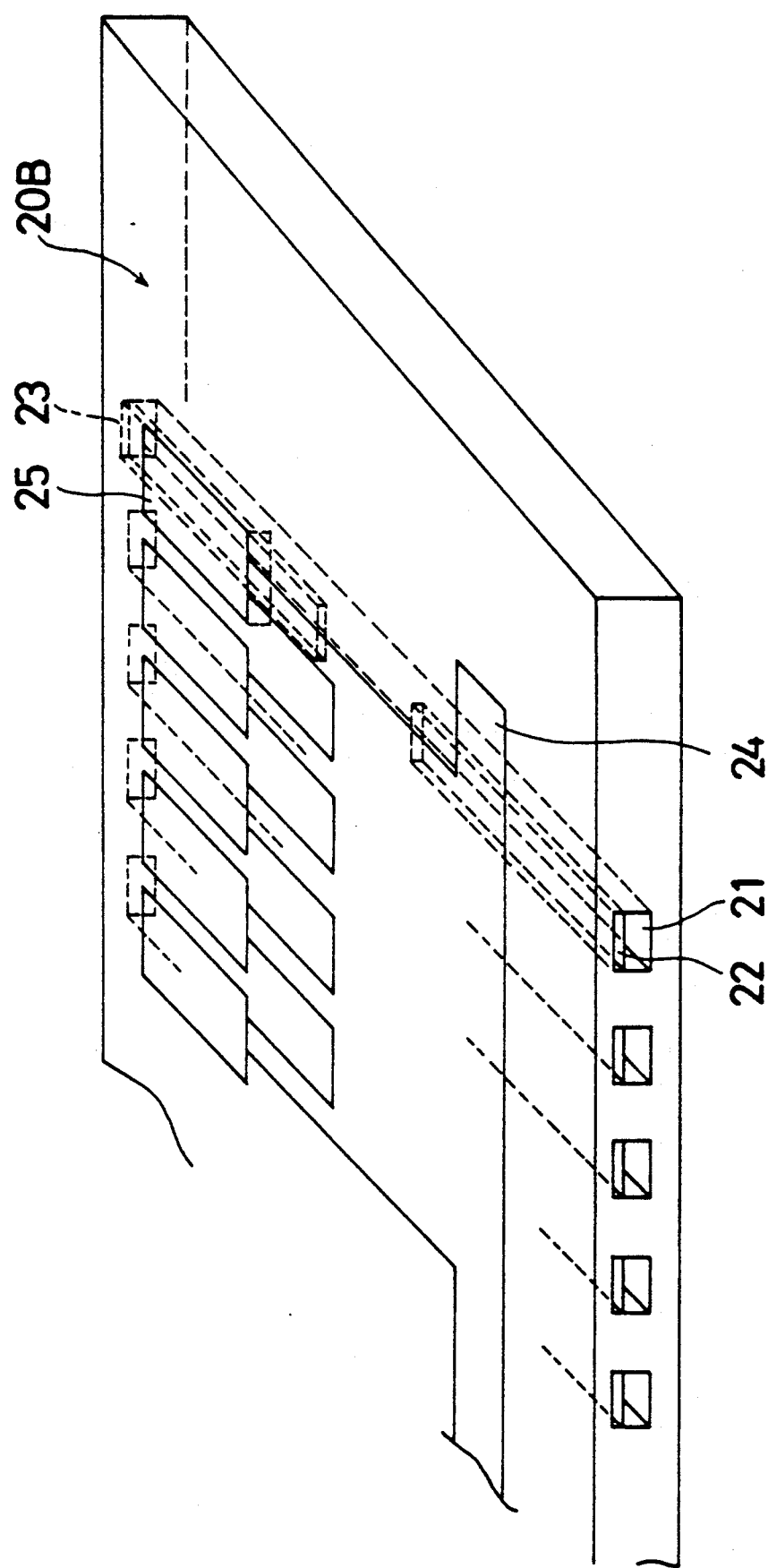

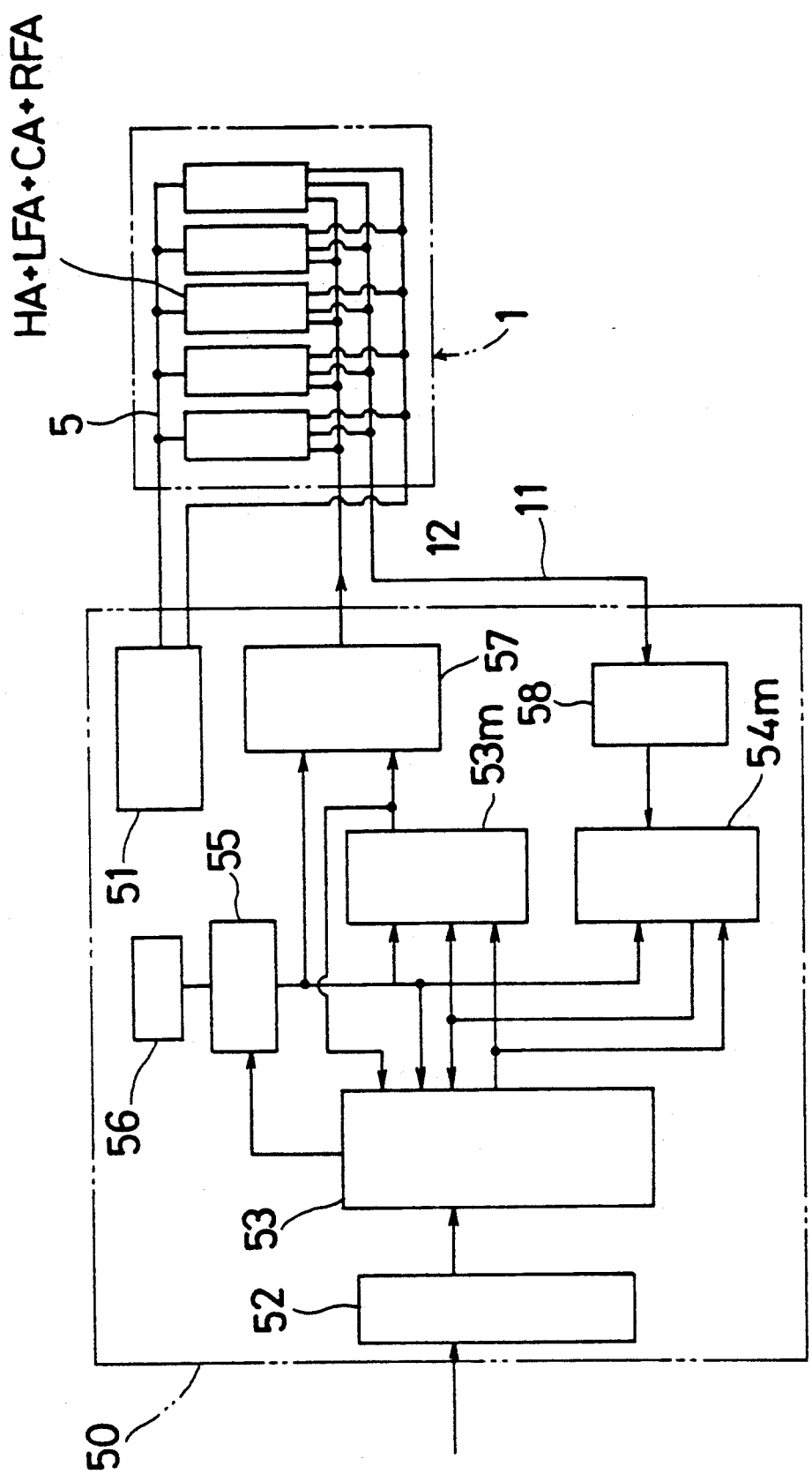

Fig. 10a
Fig. 10b
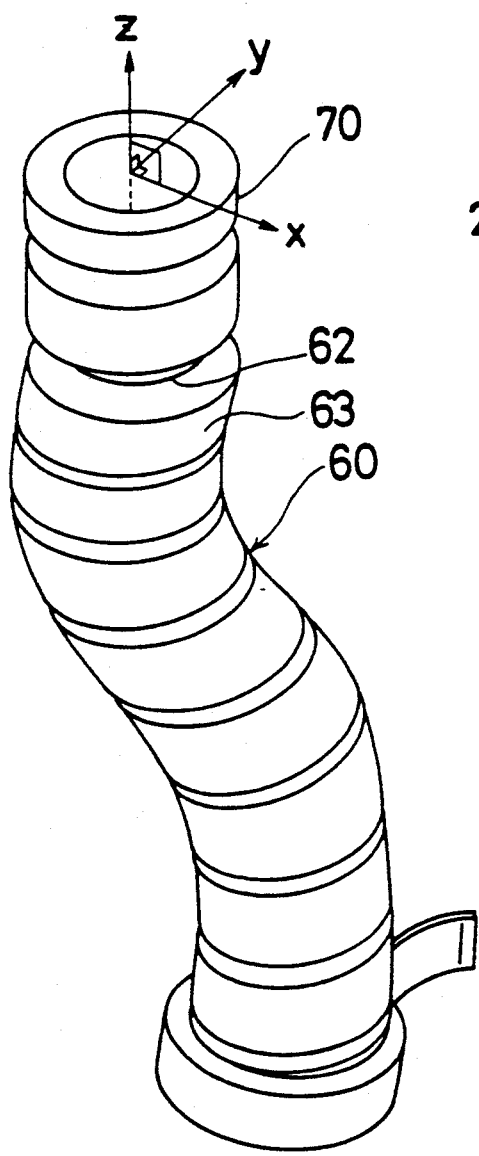
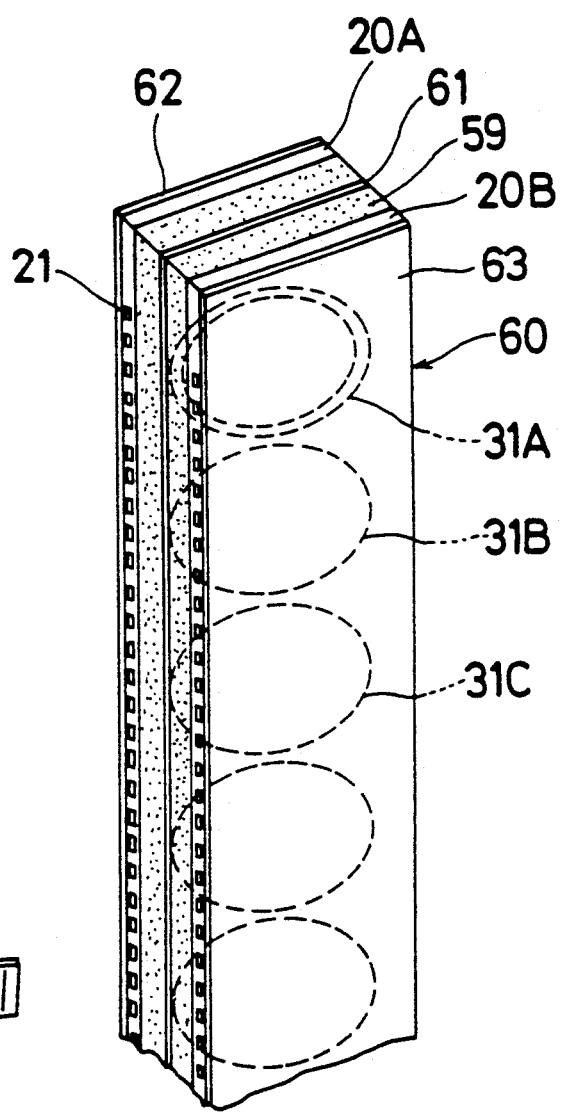

ACTUATOR

BACKGROUND OF THE INVENTION

The present invention relates to an actuator and in particular to an actuator for operating a relatively minute device such as a catheter, a manipulator for operating the cell or a manipulator for operating a robot to be used in a narrow space.

Such actuator is required to be of a miniaturized configuration as possible and to be under easy, safety control.

However, reviewing the conventional actuators, no actuator is found which complies with the foregoing two requirements.

SUMMARY OF THE INVENTION

It is, therefore, a principal object of the present invention to provide an actuator which complies with the foregoing requirements.

Another object of the present invention is to provide an actuator which can be made into a miniaturized configuration as possible and which is easy and safety in its control.

In order to attain the foregoing objects, an actuator is comprised of a plurality of three-dimensionally arranged containers each of which is constructed into deformable configuration and each of which is set to accommodate therein an amount of expandable fluid in response to the increase of the temperature, heat supply means for supplying the heat to the fluid in each of the containers, cooling means for cooling the fluid in each of the container and control menas for controlling the heat supply means and the cooling menas.

BRIEF DESCRIPTION OF THE DRAWINGS

FIG. 5 is an enlarged view of a portion of a cooling plate shown in FIG. 1;

FIGS. 6a shows a construction of a controller in the form of a block diagram;

FIG. 10a is a perspective view of the third embodiment of an actuator according to the present invention; and FIG. 10b is a perspective view of a portion of a material of a container of an actuator.

DETAILED DESCRIPTION OF THE PREFERRED EMBODIMENTS

Figure 1:
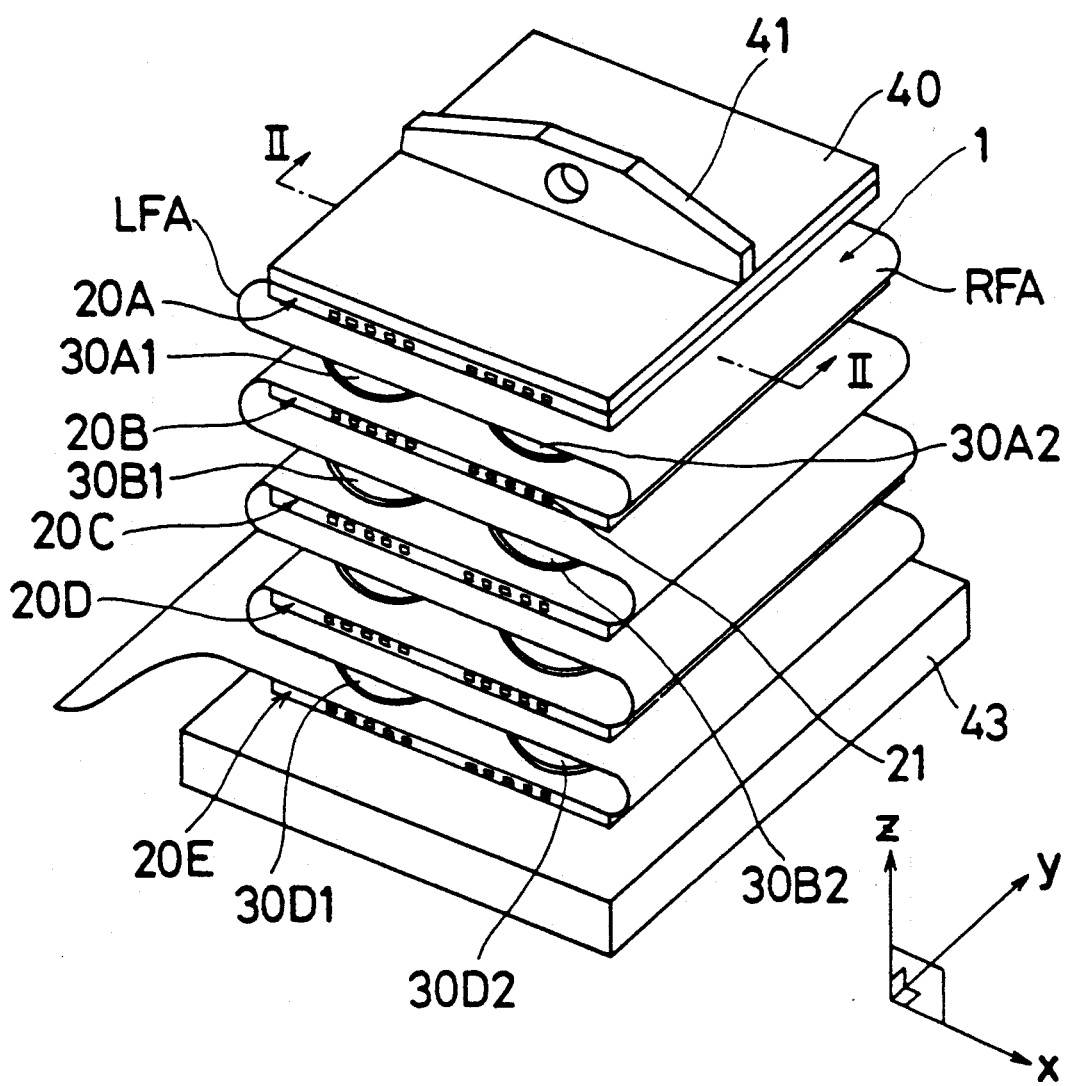
FIG. 1 is a perspective view of the first embodiment of an actuator according to the present invention.
Figure 2:
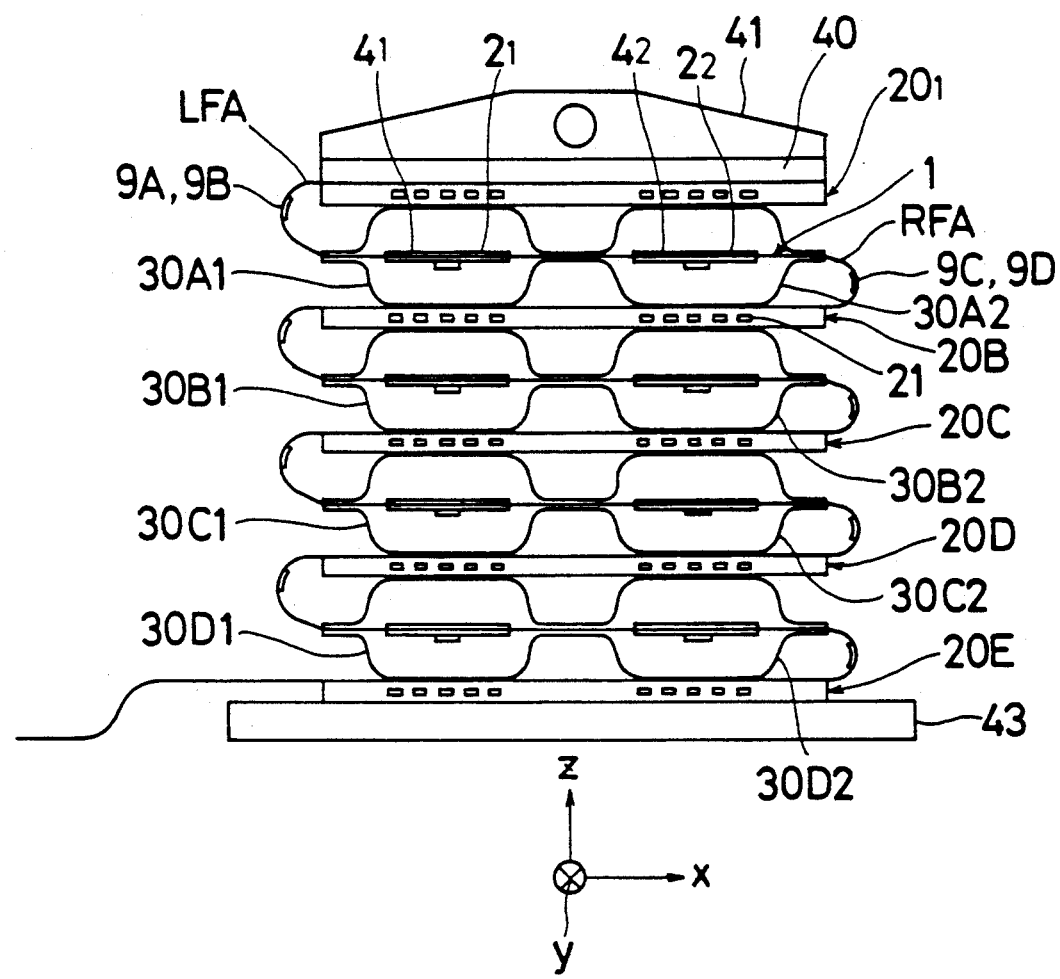
FIG. 2 is a cross-sectional view taken along line II—II in FIG. 1.

Referring first to FIGS. 1 and 2, a first cooling plate 20A is coupled, via a flexible electric circuit base plate 1, to a backside of a terminal plate 40 to which a driven member or device (not shown) is connected. The base plate 1 is bent into a zigzag configuration and its upper most portion or a first plane portion is secured with the first cooling plate 20A. A second plane portion is secured with four bellows 30A1, 30A2, 30A3 and 30A4 which constitute a first bellows group. It is noted that the member 30A3 (30A4) is not shown but is behind the member 30A1 (30A2). In each bellows 30A1/30A2/30A3/30A4, the base plate 1 is held between an upper half-portion and a lower half-portion. Thus, under such construction the base plate 1 traverses each bellows 30A1/30A2/30A3/30A4). A top surface and a bottom surface of each bellows are coupled to the first cooling plate 20A and an upper portion of a third plane portion of the base plate 1 respectively.

At a lower surfaces of a third (a fifth/a seventh/a ninth) plane portion, there is connected a second (a third/a fourth/a fifth) cooling plate 20B (20C/20D/20E).

A second set of four bellow 30B1-30B4 similar to the first set of four bellows 30A1-30A4 is disposed between the second cooling plate 20B and the third cooling plate 20C. The bellows 30B1-30B4 are traversed at the central portion thereof with a fourth plane portion of the base plate 1 and a top portion (a bottom portion) of each of bellows 30B1-30B4 is coupled to the second cooling plate 20B (the fifth plane portion of the base plate 1).

Similarly, a third set of four bellows 30C1-30C4 and a fourth set of four bellows 30D1-30D4 are respectively connected to the base plate 1 as apparent from FIGS. 1 and 2. A fifth cooling plate 20E is connected to a base member 43.

It is noted that in each bellows an amount of fluid is accomodated which is expansible in response to the increase of the temperature. Thus, the expansion and deformation of each bellows can be established by controlling the temperature therein.

Figure 3A:
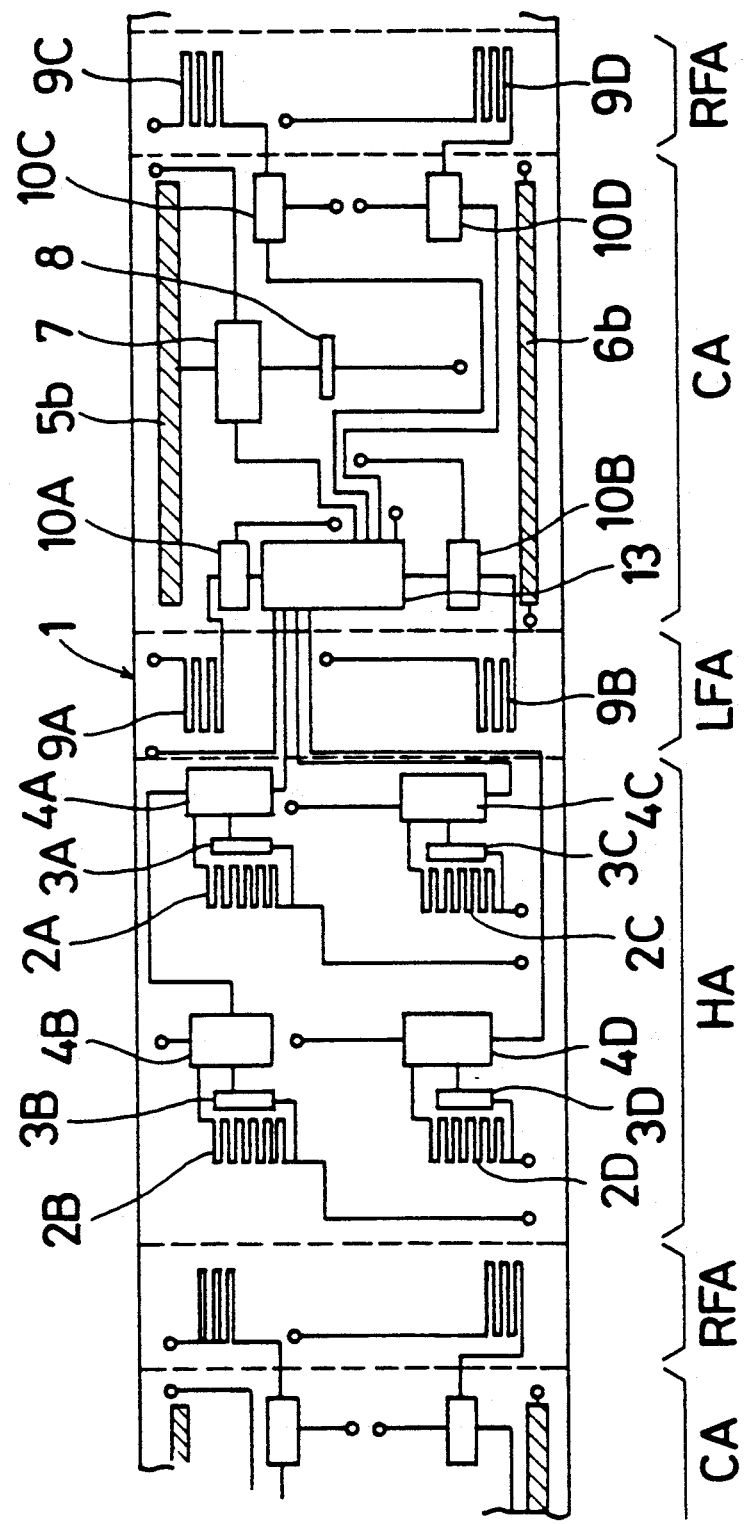
FIG. 3a is an enlarged view of one side of a flexible electric circuit base plate.
Figure 3B:
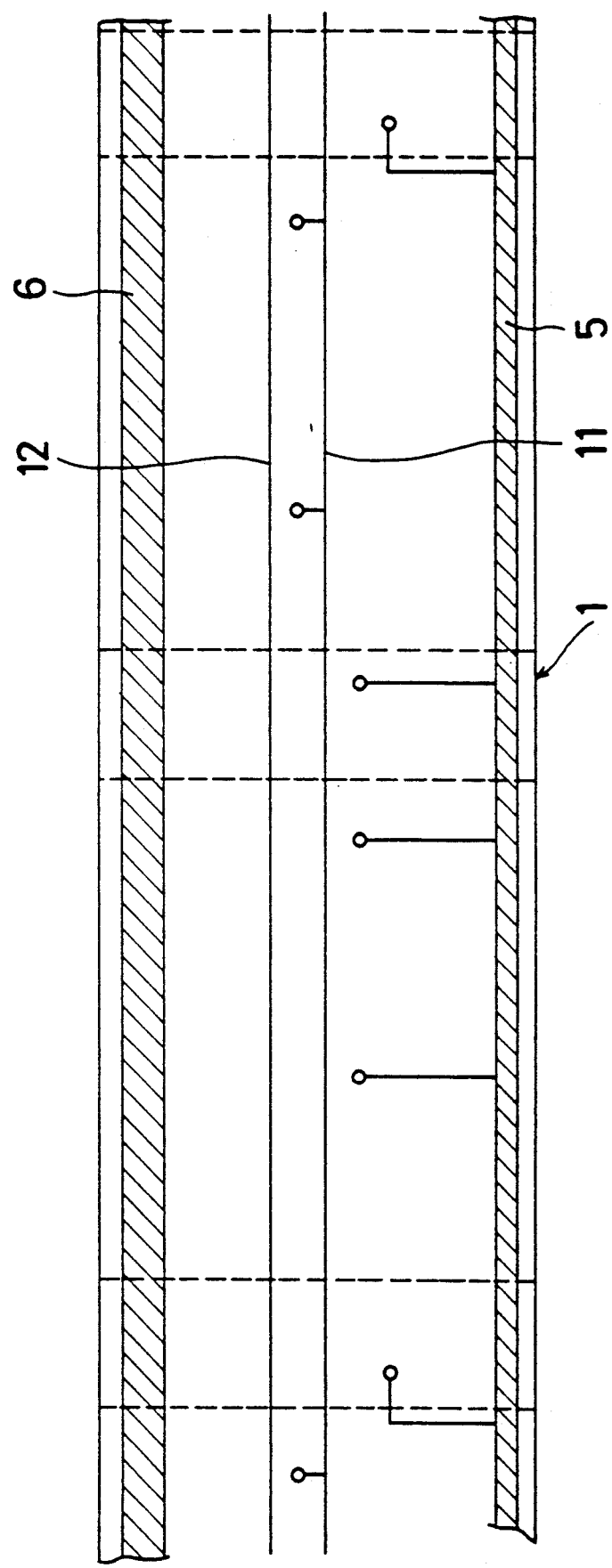
FIG. 3b is an enlarged view of the other side of a flexible electric circuit base plate.

In FIGS. 3a and 3b, opposite ends of a portion of the flexible electric circuit base plate 1 are respectively illustrated. A heating area HA is an area of the second (the fourth/ the sixth) plane portion of the base plate 1 which traversing the first set of bellows 30A1-30A4 (the second set of bellows 30B1-30B4/ the third set of bellows 30C1-30C4/ the fourth set of bellows 30D1-30D4). Four heaters 2A, 2B, 2C and 2D are arranged so as to be in coincidence with the central portions of the corresponding bellows. In the neighbourhood of each of the heaters 2A, 2B, 2C and 2D, there are provided a set of a power supply circuit 4A (4B/ 4C/ 4DO) and a thermal sensor 3A (3B/ 3C/ 3D) and one end of each of heaters 2A-2D and one end of each of sensors 3A-3D are connected via a common line to a grounding conductor 6 (FIG. 3b) at the back side of the base plate 1. The other end of each of sensors 3A-3D are connected to the other end of each of the circuits 4A-4D.

A plus voltage input terminal and a control signal input terminal of each circuit 4A/4B/4C/4D are connected respectively to a plus power conductor 5 and a decoder 13. Each circuit 4A/4B/4C/4D is set to supply the electric current to each heater 2A/2B/2C/2D upon the indication such as "H" signal from the decoder and is set to interrupt the current supply in the case of another indication such as "L" signal from the decoder 13 or the excess of the detected temperature by each sensor 3A/3B/3C/3D above a set value. The heating value per unit our of each heater 2A/2B/2C/2D is set to depend on the ON-duty control based on the foregoing signals.

A cooling area CA of the base plate 1 which is shown in FIG. 3a is corresponded to each of the first, the third, the fifth and the seventh plane portions of the base plate 1 connected to the first, the second, the third, the fourth and the fifth cooling plates 20A–20E respectively. In this area, there are provided a conductor 6b connected to the grounding conductor 6, a switching circuit 7, a switching output conductor 5b, a thermal sensor 8, switching circuits 10A, 10B, 10C and 10D and the decoder 13. In a left folding area LFA (a right folding area LRA), there are provided strain sensors 9A and 9B (9C and 9DO).

A control signal input terminal of the decoder 13 is connected to a control signal conductor 12 is set to receive four set of signals corresponding to four set of bellows from a controller 50 (FIG. 6a). Each set of signals comprises a decoder designating signal (in the form of serial signal) for selecting one or more decoders from four decoders corresponding to four set of bellows, a current supply pattern mode signal (in the form of a serial signal) for indicating the on-off mode of each heater 4A/4B/4C/4D, a cooler on-off data (in the form of 1-bit signal) and a switching mode pattern data (in the form of serial signal) for indicating the on-off mode of each switching circuit 10A/10B/10C/10D. Such four sets of signals are fed to the decoder in turn and repeatedly. When the encoder 13 detects that it is designated based on the decoder designating signal, the encoder 13 latches the subsequent current supply pattern mode signal, cooler on-off signal and switching mode pattern data, converts the current supply pattern mode signal into a signal for turning on/off each heater 2A/2B/2C/2D to be fed to each of current supply circuit 4A/4b/4C/4D, outputs the cooler on-off data to the switching circuit 7, and feeds the switching mode pattern data to the switching circuits 10A, 10B, 10C and 10D after converting the on-off signals.

Thus, if the current supply mode pattern data indicates that the heaters 2A and 2B are set to be turned on and the heaters 2C and 2D are turned off, the switching circuits 4A and 4B are turned on and the switching circuits 4C and 4D are turned off, which leads to the heat generated at heaters 2A and 2B with remaining the heaters 2C and 2D unchanged, resulting in that in a specific set of bellows two bellows such as ones 30A1 and 30A2 are brought into expansion and other two bellows such as ones 30A3 and 30A4 are remained unchanged. As a whole, the plate 40 is brought into inclination in such a manner that the left side portion thereof is elevated at a height as seen in FIG. 1.

When the cooler on-off signal is "H" indicating ON, the switching circuit 7 is closed, thereby establishing the electric connection between the switching output conductor 5b and the plus conductor 5. On the contrary. if the cooler on-off signal is "L" indicating OFF or the sensor 8 indicates detects a temperature below a set value despite of the signal "H", the switching circuit 7 remains open, by which the switching output conductor 5b is isolated from the plus conductor 5.

The switching mode pattern data is to designate or select a single specific switching circuit from the switching circuits 10A, 10B, 10C and 10D, and in the case of the turning-on of the strain sensor 9A for example the switching circuit 10A is closed resulting in the establishment of the electric connection of the strain sensor 9A to the sensor output conductor 11. That is to say, the detected strain signal by the strain sensor 9A is set to be outputted to the sensor output conductor 11.

Figure 4:
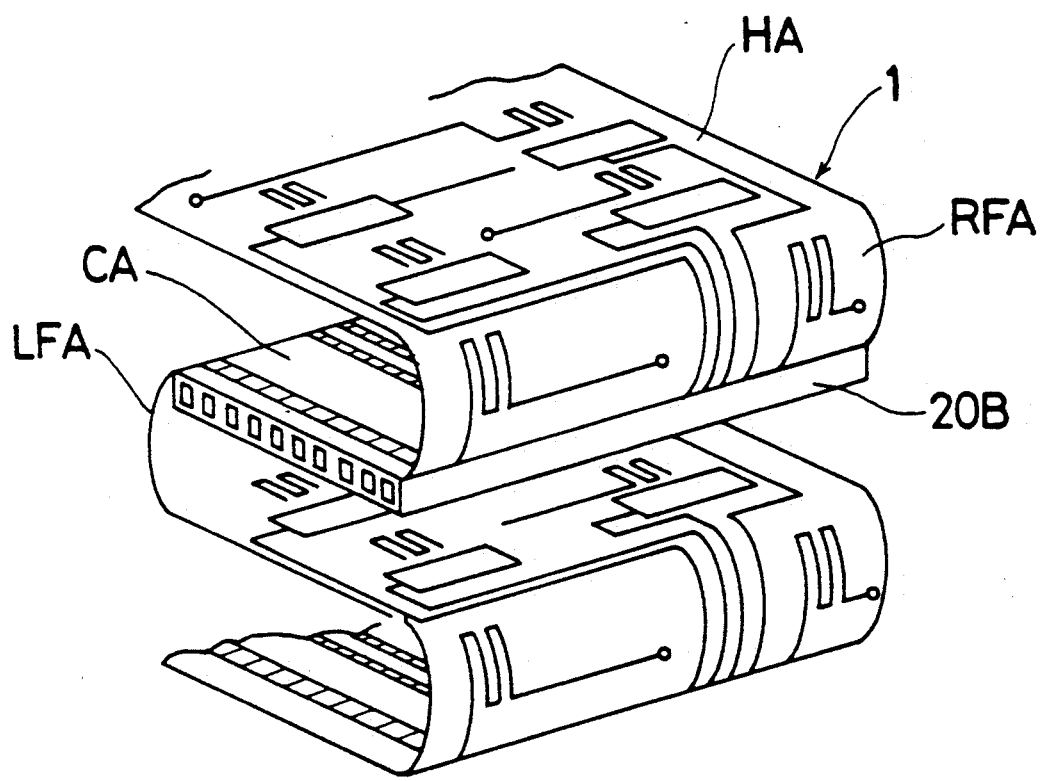
FIG. 4 shows how a flexible electric circuit base plate is bent into a zigzag configuration.

When the flexible electric circuit base plate 1 is in the form of a belt-shaped configuration, the cooling areas CA are connected respectively to the cooling plates 20A, 20B, 20C, 20D and 20E, and the heatintg areas HA are connected respectively to the bellows 30A1–30D4. Thereafter, as shown in FIG. 4, the base plate 1 is formed into a zigzag configuration in such a manner that at the left folding area LFA (at the right folding area) a horizontal extension in the rightward (leftward) direction is terminated to be bent at a curvature for initiating another horizontal extension in the rightward (leftward) direction. After such bendings are performed eight times in total and connections of bellows to the base plate 1, the actuator in the form of a solid body as a whole as shown in FIG. 1 and is obtained.

In FIG. 5, there is illustrated the cooling plate 20B in an enlarged manner and it should be noted that each of other cooling plates is of similar configuration. A plurality of paralelly arranged ducts 21 are provided in the cooling plate 20B which extend therethrough in the lateral direction thereof. In each duct 21, a negative electrode 22 and a positive electrode are provided for generating the flow of ions. The electrode 22 (23) is connected to an inner surface of one end (the other end) of the duct 21. The positive electrode 23 is connected to a circuit 25 for raising the voltage. The circuit 25 has a plane portion which is coplanner with a surface of the cooling plate 20B on which a conductor is provided for connecting the switching output conductor 5b to a positive terminal of the circuit 25. A negative terminal of the circuit 25 is connected to the grounding conductor 24. As shown in FIGS. 1 and 2, upon assembly of the cooling plate 20B in the respective bellows, the positive terminal of the circuit 25, the grounding conductor 24 of the cooling plate 20B and the grounding conductor 6b are set to be connected to the switching output conductor 5b of the cooling area CA of the base plate 1, the grounding conductor 6b of the base plate 1 and the device grounding conductor 6, respectively, resulting in that the grounding conductor is electrically connected to the device grounding conductor 6. The circuit 25 is set to generate a positive voltage to be applied to the positive electrode 23 in order to generate the flow of ions during application of the power supply to the switching output conductor or the turning-on of the switching circuit 7. Since the negative electrode 22 is connected to the device grounding conductor 6 via the grounding conductor 24 and the grounding conductor 6b, ions are generated between electrodes 22 and 23 and begins to flow along each of the ducts 21. Thus, each of these flows across the cooling plate 20B, by which the cooling plate 20B is cooled with resulting in that the lower half portion of each bellows 30A1/30A2/30A3/30A4 and the upper half of each bellows 30B1/30B2/30B3/30B4 are cooled.

Figure 6B:
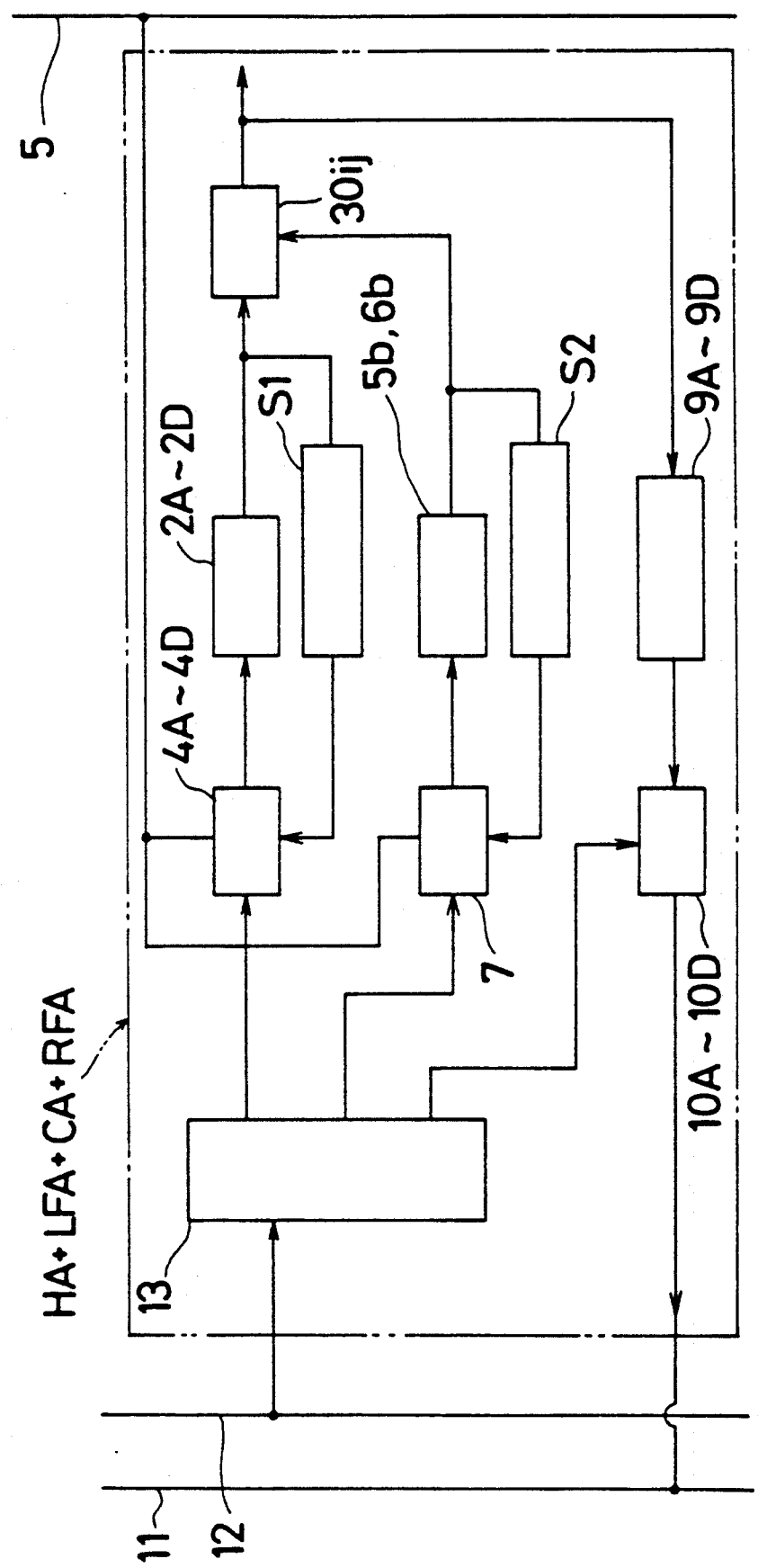
FIG. 6b shows a block diagram of an electric circuit which is formed on one unit area of a flexible electric circuit base plate.

In FIG. 6a, there is illustrated a structure of the controller 50 as an electric circuit for the control of the base plate 1 as a main portion of the actuator which is shown in FIGS. 1 and 2, and in FIG. 6b, one divisional unit of the base plate 1 which includes the heating area HA, the left folding area LFA, the cooling area CA and the right folding area RFA.

An outside interface 52 of the controller 50 is set to receive a data from a computer (not shown) indicating an attitude of the actuator such as the extension, the shrinkage, the bend or the movement. The extension data and shrinkage data indicate an extension or a shrinkage in Z-direction of the actuator respectively. The bend data includes a direction data and a degree data. The movement data indicates various movement modes—the movement in Z-direction, the swing movement in Y-direction, the swing movement in X-direction, the combination of the foregoing both swing movements, the circular movement of the plate 40, the velocity of the movement, the amplitude of the movement and so on.

These data are set to be fed from the interface 52 to a processor 53 which is in the form of a CPU of a microprocessor and stored in non-volatile memory means temporally. The attitude setting data is set to be read by respective decoder 13 and is written into a first memory 53m. The attitude setting data includes on-off distribution pattern of each heater 2A–2D, criteria of duty-control, on-off distribution pattern of the switching circuit 7 of each cooling plate 20A–20E, and other data.

In case of the setting or the change of the static attitude, a set of data is read by each decoder 13A/13D/13C/13D/13E. Contrary to this, when the attitude is dynamic or in the form of one or more movements, each decoder is set to read plural sets of data in turn or one by one.

When five sets of data corresponding to five decoders each of which is belonged to one divisional unit of the base plate 1 is fed to the first memory 53, each set of data is read by the processing unit 53 sequentially with a cycle dt and the resultant data is outputted to an encoder 57 which is in the form of a parallel-serial converter. Thus, a cycle gt for reading each data becomes constant due to the formulation of $gt = 5 \, dt$. It is noted that four target strain value in the read data corresponding to the strain sensors 9A–9D is not fed to the encoder 57 but is read by the processor 53. The on-off pattern data indicating the turning-on of one of the strain sensors 9A–9D is also fed to the encoder 57 and is set to be changed the designated sensor to be turned on at each time when the set of data changes. For example, at a first time when data is set to be fed or outputted to the decoder 13A, the strain sensor 9A is designated. At a second time, a third time and a fourth time, the strain sensors 9B, 9C and 9D are designated respectively. At a fifth time, the strain sensor 9A is designated. Thereafter, similar designation is established repeatedly.

In case of the setting or the change of the static attitude of the main portion or the base plate 1 of the actuator, so long as a new data is not fed to the interface 52, the data fed to the encoder 12 is constant or unchanged with the passing of time. However, the processor 53 gives on-off pattern data to the encoder 57, whereby the detected signal of the specific strain sensor is fed to the sensor output conductor 11. The resulting data is converted at an A/D convertor 58 into digital data and is written in a second memory 54. The resulting data is compared with a target value assigned to each strain sensor for calculating a deviance thereacross. In order to bring or set this deviation into zero, data relating to the duty control of the current supply to one or more heaters and one or more cooling plates is set to changed and the resulting data is stored in the first memory 53m.

On the contrary, in the case of the dynamic movement of the main portion or the base plate 1 of the actuator, since plural sets of data are set to be read one by one or in turn with the passing of time for each division unit of the base plate 1, the processor 53 performs the reading of each of such sets of data at a cycle of $mt = A \times gt = 4A \times dt$ where "A" is an any positive integer which is previously set to be small and large when the speed of the movement is high and low respectively corresponding thereto.

Each decoder 13A/13B/13C/13D/13E is set to receive data which is outputted from the foregoing encoder 57 when each decoder is designated by the data, latches the data after parallel conversion, and outputs pattern data is converted into a signal indicating the turning-on or turning-off of each heater 2A/2B/2C/2D (each strain sensor 9A/9B/9C/9D), which is outputted to each switching circuit 10A/10B/10C/10D (each switching circuit 4A/4B/4C/4D).

Based on the foregoing structure and function or operation, the main portion of the actuator or the base plate 1 is set to be brought into the extension, the shrinkage, the bend or the movement such as the vertical movement in Z-direction, the swing in Y-direction, the swing in X-direction, the composition of the foregoing two swings or the circumferential movement of the plate 40.

Figure 7:
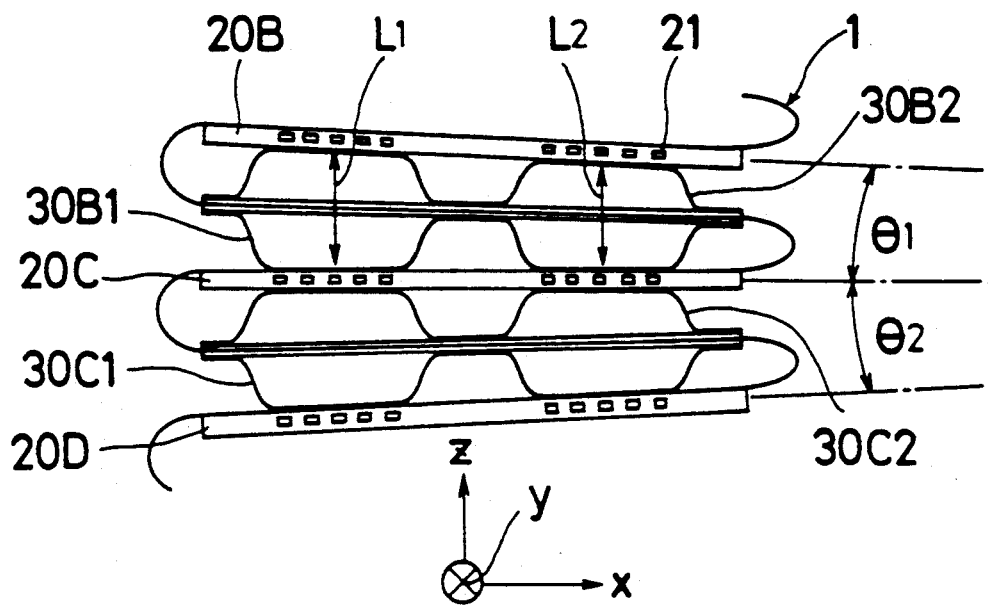
FIG. 7 is an elevational cross-sectional view of a portion of bellows under deformation.
Figure 8A:
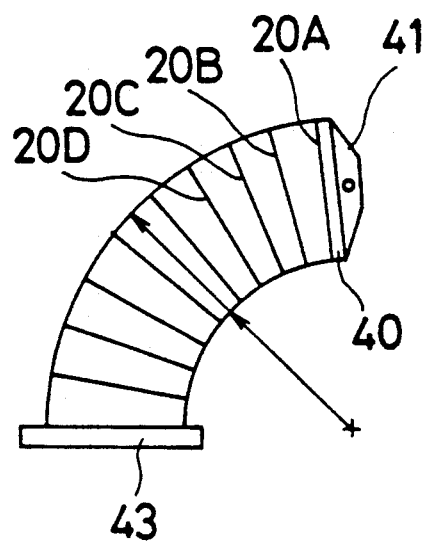
FIGS. 8a and 8b each of which shows a front view of an attitude of an actuator under deformation.

For example, when the heaters 2A and 2B in each of the heating areas HA corresponding to the second set of bellows 30B1–30B4 and the fourth set of bellows 30D1–30D4 are heated, as shown in FIG. 7, the main portion or the base plate 1 is brought into the rightward inclination. Such thermal operation is performed in all sets of bellows, the main portion or the base plate 1 is, as a whole, bent in the rightward direction as shown in FIG. 8a. The curvature of the resultant bend depends on the duty ratio of the current supply to each heater and the duty ratio of the current supply to each cooling plate. The resultant attitude or bent configuration can be kept as it is while the foregoing duty-ratios are adjusted so that the detected value at each strain sensor may be equal to the target value thereof which has been previously set corresponding to the configuration in FIG. 8a.

Figure 8B:
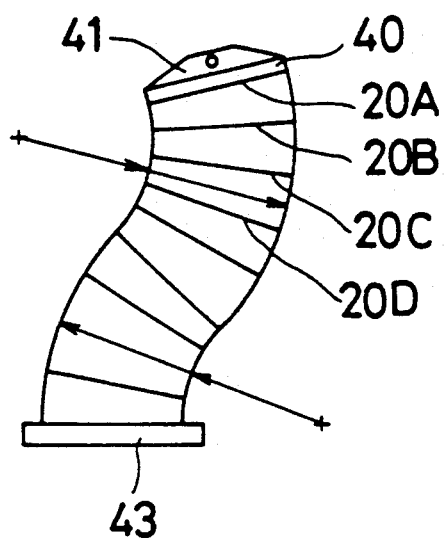

When each lower half portion of bellows is thermally actuated similar to the foregoing and each upper portion of bellows is thermally actuated oppositely to the actuation of the lower half portion of the bellows, the main portion or the base plate 1 becomes a configuration as shown in FIG. 8b. By composing these actuations and the extension in Z-direction, the plate 40 can advance in a tube bent into S-shaped configuration.

Figure 9:
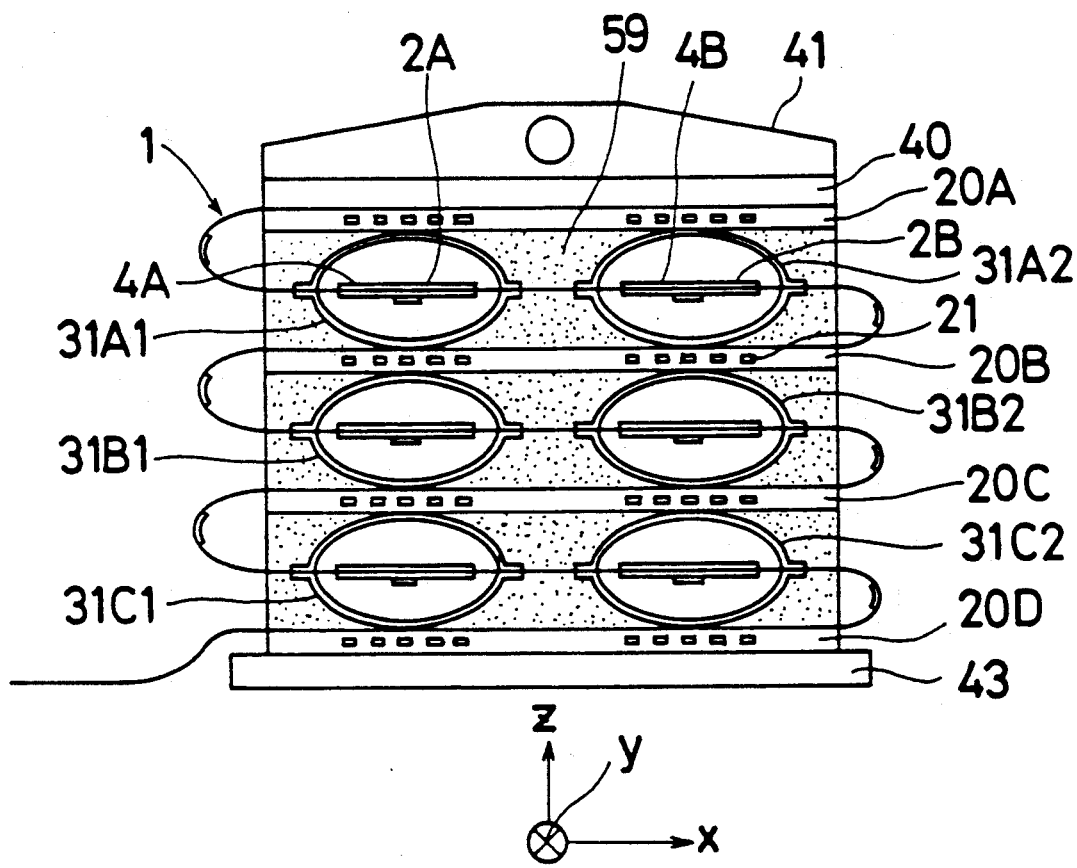
FIG. 9 is a perspective view of the second embodiment of an actuator according to the present invention.

In FIG. 9, there is illustrated a structure of an actuator according to a second embodiment of the present invention which corresponds to the actuator shown in FIG. 2. In this embodiment, instead of each of the bellows, a hollow rubber spherical member 31A1/31A2/-31A3/-31A4/31B1/31B2/31B3/31B4/31C1/31C2/31C3/31-C4 having high elasticity is employed. Each member includes an upper portion and a lower portion whose open ends are connected to an upper and lower surfaces of the base member 1 respectively. Sides of X-direction and Y-direction of each member is covered with a sponge member 59. That is to say, each hollow spherical member is within the sponge member 59 both of which are between the vertically spaced cooling plate.

Other portions in the structure and operation are identical to those in the first embodiment. In this embodiment, the main portion or the base plate 1 is more flexible in any of X, Y and Z-directions compared to the first embodiment due to employment of each elastic rubber made spherical member. This means that less possibility of the generation of shock to the plate 40 and actuator per se.

A third embodiment of the present invention is illustrated in FIG. 10a. In this embodiment, a band-shaped ribbon 60 is spirally wound on a tube 70 with a high flexibility. The detailed structure of the ribbon 60 per se is shown in FIG. 10b in an enlarged scale. The ribbon 60 has three flexible electric circuit base plates 61, 62 and 63. The base plate 61 (63) includes a plurality of continuously arranged divisional units shown in FIG. 3a each of which has the left folding area LFA, the cooling area CA and the right folding area RFA. The base plate 62 is set to include a plurality of continuously arranged units each of which heaters and thermal sensors with a function of the ability for understanding the designation of itself. Rubber made flexible spherical hollow members 31A, 31B, - - - are within the sponge 59 which is held between flexible cooling plates 20A and 20B. Thus structured ribbon 60 is set to be wound in such a manner that the flexible electric circuit base plate 63 is oriented inwardly or is to be on an outer surface of the tube 70.

In this third embodiment, since plural spherical members are in alignment each other, a control is established on single spherical hollow member as a unit. However, from the view point of attitude control, virtually, spherical hollow members are divided into groups (1, 2, - - - , n) in the lengthwise direction of the tube 70 and plural spherical members on a common group in the circumferential direction of the tube 70 are assigned different numbers (1, 2, - - - , m).

The bend is established by the current supply to the specific heater in the specific numbered spherical member in the specific group, the duty control thereof, and the control of the cooling plate near the designated spherical member. Such bend with the passing of time realizes the bending movement.

The most remarkble feature of the third embodiment is to obtain a feeding spiral movement, an absorbing spiral movement, a squeezing feed movement, a squeezing absorb movement and the combination any two of them.

The feeding spiral movement is established in such a manner that each spherical member is heated by the corresponding heater one by one or in turn from the designated spherical number to the most upper spherical member along the ribbon 60, the cooling of each spherical member is performed following each heating and the heating and the cooling are repeated. The feeding speed depends on the duty-ratio of the current supply to each heater and the duty-ratio of the current supply to each cooling plate.

The absorbing spiral movement is established by the opposite operation of the feeding operation.

It is noted that the upper half portion and the lower half portion of the actuator are brought into the feeding spiral and the absorbing spiral movements respectively resulting in the formation of an intermediate portion in the form of a barrel in which a relatively large amount of fluid can be stored. In the reverse case, the negative pressure can be developed in the intermediate portion.

The squeezing feeding movement. is established in such a manner one or more spherical members are heated by corresponding heater or heaters at the same level in turn from the designated level to one or more spherical members at the most highest level in the lengthwise direction of the tube 70, the cooling operations are performed similar to the heating after a time lag, and the heatings and coolings are repeated. The feeding speed and volume are as same as those in the spiral feeding spiral movement.

The squeezing absorbing movement can be established by the reverse operation of the squeezing feeding movement.

It is noted the different or opposed operations in the upper and lower half portions of the actuator brings the storing of fluid or the development of negative pressure similar to the foregoing.

By combinating any two or more movements as mentioned above, the actuator as shown in FIG. 10a can be inserted into the complexed bent tube and can supply of the fluid into, absorb the fluid from, and transfer the liquid within the tube. The actuator is so flexible that it can be used as an auxiliary tube of the living body.

Instead of each cooling panel, a cooling element using Peltier Effect can be used. In addition, an element which can realize both of Pelter Effect and Seebeck Effect is available instead of the heater and cooling plate. An employment of such element enables rapid change of the actuator.

While the invention has been particularly shown and described with reference to preferred embodiments thereof it will be understood by those in the art that the foregoing and other changes in form and details may be made therein without departing from the spirits and scope of the invention.

What is claimed is:

1. An actuator comprising:
    a plurality of longitudinal segments, each of said segments including at least two laterally adjacent deformable containers, each of said containers enclosing fluid expandible in response to increase in temperature;
    heat supply means for supplying the heat to the fluid in each of the containers;
    cooling means for cooling the fluid in each of the containers; and
    control means for controlling the heat supply means and the cooling means.

2. An actuator comprising:
    a plurality of aligned containers each of which is constructed into a deformable configuration and each of which is set to accommodate therein an amount of expandable fluid in response to the increase of the temperature;
    a flexible cylinderical member in which the plural containers are accomodated;
    a flexible ribbon member wound around the flexible cylindrical member and having heat supply means for supplying the heat to the fluid in each of the containers and cooling means for cooling the fluid in each of the containers; and
    control means for controlling the heat supply means and the cooling means.

3. An actuator according to claim 1, wherein each of the containers is in the form of a bellows.

4. An actuator according to claim 1, wherein each of the containers is comprised of a hollow elastic spherical member and an elastic cover member for enveloping the elastic spherical member.

5. An actuator according to claim 1, wherein the heating means is in the form of a resistive heating element.

6. An actuator according to claim 1, wherein the heating means is connected to a flexible electric circuit base plate.

7. An actuator according to claim 1, wherein the cooling means is in the form of a duct having plural passages each of which is opened outward of each of the containers.

8. An actuator according to claim 7, wherein each fluid passage is provided with a pair of electrodes for generating the flow of ions.

9. An actuator according to claim 2, wherein each of the containers is in the form of a bellows.

10. An actuator according to claim 2, wherein each of the containers is comprised of a hollow elastic spherical member and an elastic cover member for enveloping the elastic spherical member.

11. An actuator according to claim 2, wherein the heating means is in the form of a resistive heating element.

12. An actuator according to claim 2, wherein the heating means is connected to a flexible electric circuit base plate.

13. An actuator according to claim 2, wherein the cooling means is in the form of a duct having plural passages, each of which is opened outward of each of the containers.

14. An actuator according to claim 13, wherein each fluid passage is provided with a pair of electrodes for generating the flow of ions.

15. An actuator according to claim 1, wherein the cooling means includes duct means for the passage of a cooling medium.

16. An actuator according to claim 15, wherein the duct means includes an ion generator.

17. An actuator according to claim 2, wherein the cooling means includes duct means for the passage of a cooling medium.

18. An actuator according to claim 17, wherein the duct means includes an ion generator.

19. An actuator comprising:
a plurality of longitudinal segments, each of said segments including at least two laterally oriented deformable containers, each of said containers enclosing fluid expandable in response to increase in temperature;
heat supply means positioned in each of the containers for supplying the heat to the fluid in each of the containers;
cooling means for cooling the fluid in each of the containers; and
control means for controlling the heat supply means and the cooling means.

20. An actuator according to claim 19 further comprising a flexible electric circuit base plate of zig-zag configuration and passing through the containers, said heat supply means in each of the containers being connected to the flexible electric circuit base plate.

21. An actuator according to claim 20, wherein the flexible electric base plate includes portions positioned at opposite end surfaces of each container in the longitudinal direction and wherein the cooling means for each container is secured to one of the portions of the electric base plate to be in abutment with at least one of the end surfaces of each container, respectively.

* * * * *